United States Patent
Bakhmutov

(10) Patent No.: US 8,468,601 B1
(45) Date of Patent: *Jun. 18, 2013

(54) METHOD AND SYSTEM FOR STATISTICAL ANALYSIS OF BOTNETS

(75) Inventor: Andrey V. Bakhmutov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 917 days.

This patent is subject to a terminal disclaimer.

(21) Appl. No.: 12/395,477

(22) Filed: Feb. 27, 2009

Related U.S. Application Data

(63) Continuation-in-part of application No. 12/256,403, filed on Oct. 22, 2008.

(51) Int. Cl.
*G08B 23/00* (2006.01)

(52) U.S. Cl.
USPC .................. 726/23; 726/22; 726/24; 709/206

(58) Field of Classification Search
USPC ...................... 726/22–24; 709/206
See application file for complete search history.

(56) References Cited

U.S. PATENT DOCUMENTS

| | | | |
|---|---|---|---|
| 7,475,118 B2 * | 1/2009 | Leiba et al. | 709/206 |
| 7,809,824 B2 * | 10/2010 | Wei et al. | 709/223 |
| 7,849,146 B2 * | 12/2010 | Choi et al. | 709/206 |
| 2008/0005316 A1 | 1/2008 | Feaver et al. | |
| 2008/0080518 A1 * | 4/2008 | Hoeflin et al. | 370/395.42 |
| 2008/0301809 A1 | 12/2008 | Choi | |
| 2008/0307526 A1 * | 12/2008 | Chung et al. | 726/23 |
| 2008/0320095 A1 | 12/2008 | Pearson et al. | |
| 2009/0249481 A1 | 10/2009 | Long et al. | |
| 2009/0254989 A1 * | 10/2009 | Achan et al. | 726/22 |
| 2009/0265786 A1 | 10/2009 | Xie et al. | |
| 2010/0095374 A1 * | 4/2010 | Gillum et al. | 726/22 |
| 2010/0281539 A1 * | 11/2010 | Burns et al. | 726/23 |

FOREIGN PATENT DOCUMENTS

EP   1 906 620 A   4/2008

OTHER PUBLICATIONS

Husna, Husain et al., "Behavior Analysis of Spam Botnets", Communication Systms Softwre and Middleware and Workshops (COMSWARE), 2008, $3^{rd}$ International Conference, IEEE Piscataway, NJ, USA, Jan. 6, 2008, pg. 246-253.*

Anestis Karasaridis et al: "Wide-Scale Botnet Detection and Characterization", Proceedings of the Workshop on Hot Topics in Understandingbotnets (HOTBOTS), Apr. 10, 2007.

Hyunsang Choi et al: "Botnet Detection by Monitoring Group Activities in DNS Traffic", Computer and Information Technology, 2007, 7TH IEEE International Conference IEEE, Piscataway, NJ, USA, Oct. 16, 2007.

(Continued)

*Primary Examiner* — Yin-Chen Shaw
(74) *Attorney, Agent, or Firm* — Bardmesser Law Group

(57) ABSTRACT

A method, and computer program product for updating botnets are described. A statistical method for analyzing the hosts that send out SPAM and updating botnets is provided. The proposed method uses the fact that a computer in a botnet has to distribute content using the activity patterns closely resembling the distribution patterns of other computers in the same botnet over the same time period. The distribution statistical data obtained for different sources are compared using approximation of graphical data. Based on comparison it is determined whether the computer belongs to a botnet and the botnet is updated accordingly.

16 Claims, 11 Drawing Sheets

OTHER PUBLICATIONS

Husna H et al: "Behavior analysis of spam botnets", Communication Systems Software and Middleware and Workshops, 2008, 3rd International Conference, IEEE, Piscataway, NJ, USA, Jan. 6, 2008.

Claudio Mazzariello Ed.—Anonymous: "IRC Traffic Analysis for Botnet Detection", Information Assurance and Security, ISIAS '08, Fourth International Conference, IEEE, Piscataway, NJ, USA, Sep. 8, 2008.

Paul Bacher, Thorsten Holz, Markus Kotter, Georg Wicherski: "Know your Enemy: Tracking Botnets" www.honeynet.org, [Online-http://www.honeynet.org/papers/bots/ Retrieved from the Internet: http://www.honeynet.org/book/export/html/50>], Aug. 10, 2008.

Search report in EP 09251557.6, dated Nov. 24, 2009.

Zhuang et al (Characterizing Botnets from Email Spam Records); Apr. 15, 2008.

Gu et al., "BotMiner: Clustering Analysis of Network Traffic for Protocol- and Structure-Independent Botnet Detection," Aug. 2008.

Cooke et al., "The Zombie Roundup: Understanding, Detecting, and Disrupting Botnets," Jul. 2005.

\* cited by examiner

METHOD AND SYSTEM FOR STATISTICAL ANALYSIS OF BOTNETS

CROSS-REFERENCE TO RELATED APPLICATION

This application is a continuation-in-part of U.S. patent application Ser. No. 12/256,403 filed on Oct. 22, 2008, entitled METHOD AND SYSTEM FOR TRACKING BOTNETS, which is incorporated by reference herein in its entirety.

BACKGROUND OF THE INVENTION

1. Field of the Invention

The present invention is related to anti-spam technology, and more particularly, to a method for analyzing statistics collected for botnets sending out SPAM.

2. Description of the Related Art

SPAM emails have become a veritable scourge of modern email systems. It has been estimated that as much as 60-80% of Internet email traffic today is of a SPAM nature. SPAM, in addition to being annoying and wasteful of the time of the recipient, places considerable burden on large email service providers, and on corporate networks. For a "regular user," the "cost" of SPAM that gets through is the few clicks that it takes to delete the offending message.

For large scale email providers, such as Google, Yahoo, Microsoft, as well as for large corporations that have their own server-based solutions for SPAM filtering, handling SPAM is a problem that needs to be solved on an industrial scale. For example, such large mail service providers need to filter millions of SPAM messages every hour.

One phenomenon observed recently is the increasing professionalism of SPAM generators. Many of the techniques used by SPAM generators closely mirror, and borrow from, techniques used by professional virus writers. It has been estimated that at any given moment, millions computers connected to the Internet are zombified (i.e., compromised). In other words, these computers spew out vast numbers of SPAM emails, and emails with malicious attachments, even though the owners of these computers are unaware of this.

Large quantities of spam are now being sent by networks of compromised computers—botnets. The activity of these networks is of serious concern to security professionals all over the world, and the problem of tracking botnets is receiving considerable attention. However, large distributed networks of computers, most of which have dynamic IP addresses, are hard to track and separate from each other in order to identify a computer sending out SPAM in real time.

Another SPAM-related problem is a filtering out false positives. Generally, in the industry, a false positive is regarded as a much greater evil than letting through some number of SPAM messages, since very often, an email that was falsely identified as SPAM by the SPAM filter will never be seen by its intended recipient, or, at best, would be seen much later by the intended recipient.

In general, many present methods for SPAM identification have not been fully successful. For example, attempts to work with filters for sorting out source addresses of bulk email distributors have not proven successful. A network of compromised computers under a common control infrastructure is a powerful tool for managing various kinds of illegal activity. Such networks are commonly used for Distributed Denial-of-Service (DDoS) attacks, sending out SPAM, spreading malware or other malicious purposes.

Significant surges in SPAM activity are now being linked to the increasing use of botnets by spanners. Large computer networks distributed over several countries and continents are hard to track, and since most of the computers in such networks have dynamic IP addresses that can change every time the computer is started, deploying traditional blacklisting services is of almost no use.

To resist massive SPAM attacks from these bot networks, an instrument that is able to keep track of them in real time is needed. The lists of IP addresses of computers that constitute botnets need to be updated frequently to keep current with the changes in the set of active hosts. This is necessary to ensure a quick response to new SPAM sources and to exclude false positives when IP addresses drop out of the botnet.

One possible approach includes an in-depth examination of the MIME structure and performing analysis of the message content. The similarities between large numbers of messages, and hence the likelihood of their sources belonging to the same botnet, could be established even if changes were made to some of the messages—a practice that is widely used by spammers. However, this approach is both technically and administratively infeasible because the email destinations are mailboxes distributed all over the world.

Downloading millions of email messages from the destination mailboxes every hour to one location and analyzing them is not feasible. It can be extremely costly. Besides, this method would be inadvisable for security and privacy protection reasons, as it would mean private emails are being relayed to a third party for analysis.

Yet another possible approach is to analyze the fingerprints of the messages, rather than the messages themselves. A mail agent receiving a message can take its fingerprint and send it, along with the IP address of the source host, to a specific location for analysis. Then, hundreds or thousands of source hosts sending out messages with the same fingerprint would be indicative of a botnet. This approach can be implemented, since the size of a fingerprint is just a few bytes (typically 16 bytes) and it is impossible to recover a message from its fingerprint. Thus, clients' privacy can be protected.

The disadvantage of this approach is a need to construct such a fingerprint, so that it remains invariable under a transformation of the message. This would require a thorough examination of the message content including attached pictures, documents, etc. Spammers use various techniques to distort messages even within the same distribution. The message parts and attributes that can be altered are the text, the number, size and formats of attachments, images, text and transfer encodings, etc. As a result, even sufficiently "fuzzy" fingerprints do not guarantee detection. Moreover, increasing the "fuzziness" of the fingerprint is likely to result in a large number of false positives.

The false positives can be eliminated by analyzing botnets' statistics and maintaining botnets current by adding hosts sending out SPAM to the existing botnets. Accordingly, an efficient method for collecting and analyzing botnet's statistics is desired. It is also desired to have a method for maintaining and updating botnets based on statistical data collected from the botnets and from individual hosts sending out potential SPAM.

SUMMARY OF THE INVENTION

The present invention is intended as a method for analyzing statistics collected for botnets sending out SPAM that substantially obviates one or several of the disadvantages of the related art.

In one aspect of the invention there is provided a system, method and computer program product for tracking and isolating botnets. According to the exemplary embodiment, a statistical method for tracking botnets is provided. The proposed method uses the fact that a computer in a botnet has to distribute content which resembles to some degree the content distributed by the other computers in the same botnet.

The size of the messages (or another parameter) sent by a particular computer over a period of time can be tracked. The resulting distribution of message numbers by size is, then, associated with that computer. The distribution statistical data obtained for different sources over a period of time are then compared. Computers from the same botnet have similar (although not identical) distribution data. The accuracy of the proposed method depends on the amount of statistical data gathered and the comparison method used.

The exemplary embodiment processes data over a pre-set time period (for example, every hour), detecting and refining botnets identification, and determining the false positive probabilities for each of the botnets. The exemplary embodiment can be used to determine the boundaries of botnets in real time provided that a sufficient amount of the statistical information is available.

Therefore, according to the exemplary embodiment, a statistical approach to the problem of isolating and tracking botnets is used. The proposed method assumes that it is possible to monitor a large number of mail messages send from different locations. The more message sources are analyzed, the more messages from each of the sources are used in the statistical analyses and the better the results.

The method, according to the exemplary embodiment, is based on the fact that computers from the same botnet send out similar content over a certain time period (for example, several hours). An approach allowing combining different sources of email messages into a list of botnet addresses is provided.

In yet another exemplary embodiment, the statistical data is collected for botnets and for individual hosts. The statistical data is analyzed and the botnets are updated by adding new hosts. A statistical method for analyzing the hosts that send out SPAM and updating botnets is implemented based on distribution statistics collected from different botnets and from numerous single hosts.

The proposed method uses the fact that a computer in a botnet has to distribute content using the activity (i.e., distribution patterns) closely resembling the distribution patterns of other computers in the same botnet over the same period of time. Based on comparison of the distributions statistics (such as, for example, peaks, patterns, time characteristics, etc.) it is determined whether the computer belongs to a botnet. If the computer belongs to the botnet, the list of hosts that make up the botnet is updated accordingly. Thus, the botnet can be dealt with in a more efficient way.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 9 illustrates exemplary statistical analysis of an activity of a single host as it compares to the activity of the botnet the host belongs to;

DETAILED DESCRIPTION OF THE PREFERRED EMBODIMENTS

Figure 1:
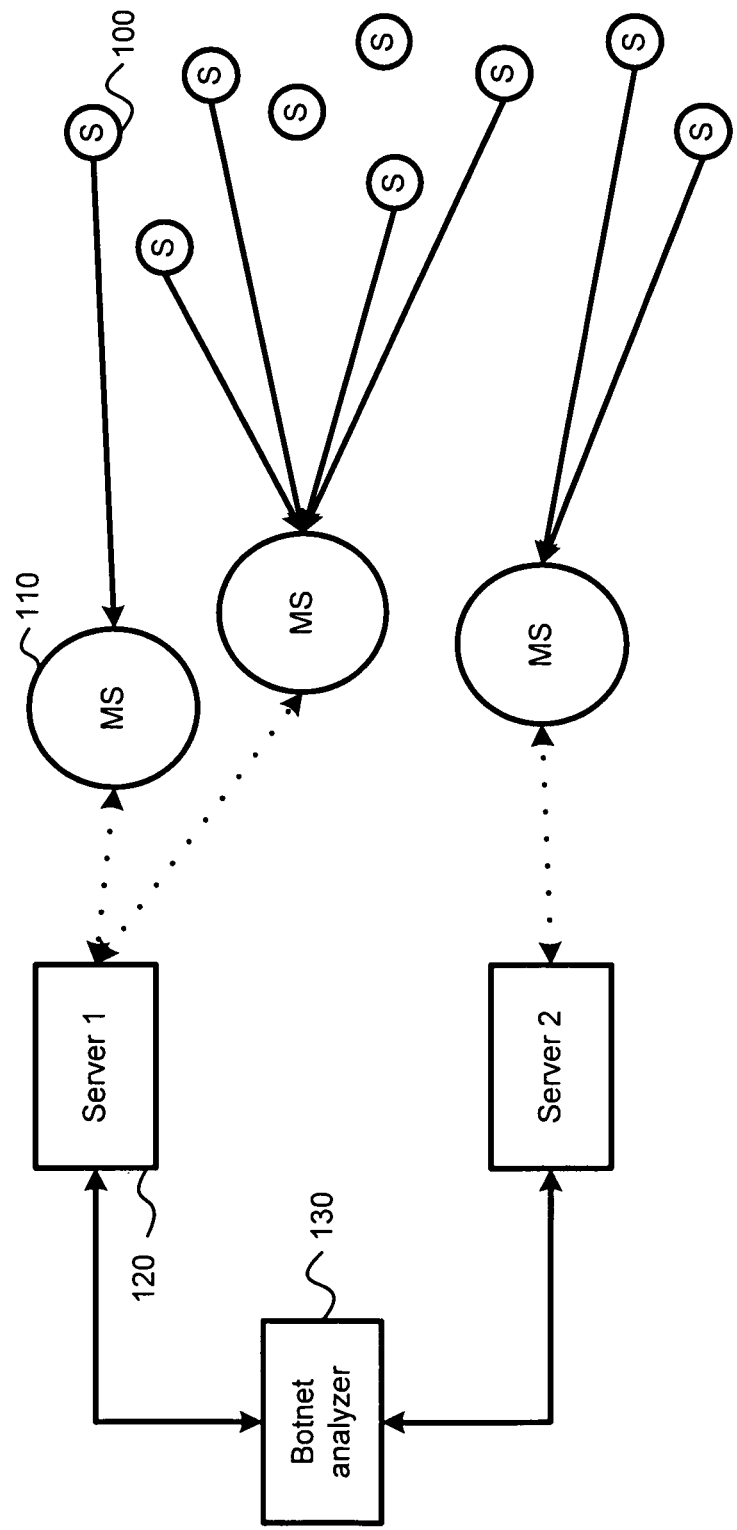
FIG. 1 illustrates a system for collecting statistical data of messages sent from various sources, in accordance with the exemplary embodiment.

Reference will now be made in detail to the preferred embodiments of the present invention, examples of which are illustrated in the accompanying drawings.

The present invention is intended as a method and system for tracking and isolating botnets sending out SPAM. In one aspect of the invention there is provided a system, method and computer program product for tracking and isolating botnets. According to the exemplary embodiment, a statistical method for tracking botnets is provided. The proposed method uses the fact that a computer in a botnet has to distribute content that resembles, to some (usually significant) degree, the content distributed by the other computers in the same botnet.

As one example, the sizes of messages sent by a particular source computer over a period of time are tracked. The resulting distribution of message numbers by size is then associated with that source computer. The distribution statistical data obtained for different sources are then compared. Computers from the same botnet have similar (although often not identical) distribution data. The accuracy of the proposed method depends on the amount of statistical data gathered and the comparison method used.

The exemplary embodiment relies on statistical information gathered from multiple email message sources. Every time a mail agent receives a message, it sends a piece of information related to that message (i.e., a message parameter), along with the IP address of the message source host, to an analyzer. The botnet analyzer is preferably a dedicated host with a sufficient computational power. For every IP address, the analyzer keeps statistics of a distribution of the number of messages by this parameter. In other words, each parameter matches the number of messages that correspond to that parameter.

Generally, the parameters can be of two types—message timestamp (i.e., the time the message was received, and message characteristics—any other property of the message acquired by analyzing the message. In the simplest case, the message characteristic is the message size. However, there are many other characteristics that can be used. For example, the message can be classified by class, priority/flags, word counts, particular word occurrences, and so on. Also, various fuzzy checksums and fuzzy fingerprints can be calculated, including those calculated based on so-called "shingles". Note that multiple parameters can be used simultaneously.

For example, if the parameter used for analysis is a message size, then for every 100-byte interval, the analyzer records the number of messages with sizes that fall into this interval. If the parameter is a timestamp, then for every 15-minute interval the analyzer records the number of messages sent out in this time interval.

According to the exemplary embodiment, all messages are divided into five categories: "spam", "probable spam", "not detected", "formal" and "trusted." An anti-spam system is installed on a client that supplies the analyzer with data, and this system classifies email messages. The parameter can be a message category and the analyzer records how many messages had the category "spam", spam" etc. Having collected distributions statistics for different sources over a certain period of time, the analyzer compares them.

While distributions of statistical data for different sources will differ, they will resemble each other as long as the sources are from the same botnet, Note that the proposed method, advantageously, compares functions, rather than scalar values. It is intuitively obvious that in a hypothetical botnet-free environment, it would be difficult to find several thousand sources of email that had almost identical "non-trivial" distributions statistics collected across several million randomly chosen hosts.

The proposed method is supported by precise calculations and numerous experiments. For an isolated network, a probability of false positives (i.e., the probability of a host that is not a part of the botnet being placed on a list of botnet addresses) is close to zero. Note that the exemplary embodiment uses a statistical distribution of message numbers by size. However, the method is not restricted to size parameter. For example statistical distribution based on a message status or timestamp can be used.

The exemplary embodiment deals with email messages on a large scale. A system designed to resist SPAM attacks from botnets has to be highly distributed. FIG. 1 illustrates a system for collecting statistical data of messages sent from various sources in accordance with the exemplary embodiment. The system has a client-server architecture and uses the UDP protocol for communication. The clients operate on the mail system hosts 110 that are to be protected from SPAM sent by source computers 100.

The clients query servers 120 for the checksum statuses of the messages they receive. In the exemplary embodiment, the format of a query packet has been modified to include "source IP-message size" pairs. Thus, every time the mail system 110 receives a message from the source 100, the size of the message and the IP address of the source 100 are transmitted to one of the servers 120. The servers' 120 reply can contain the status of the reported IP address if the information is available.

The status includes information on whether the address belongs to a botnet. It can also specify how much the result can be trusted in case if the address does belong to a botnet. This data is used to instruct the mail server on how to deal with messages from this IP address. The servers 120 also register timestamps for the queries, enabling the analysis of message numbers by time distribution statistics for every source 100. It is worth noting that many botnets exhibit a time-of-day dependence on their activity (usually due to the fact that the human controller, who sends out commands to the botnet, lives in a particular time zone, and the botnet activity matches his "daytime working" hours). This fact can be used as an additional control parameter. Other botnets do not exhibit such behavior, if their activity is pre-programmed in advance.

The servers 120 cache statistical distributions data for every source address until it is demanded by the botnet analyzer 130. The botnet analyzer 130 downloads the cached data from the servers 120, for example, every hour, merges it with the distribution statistics for the current day, and processes the updated data by sorting out similar distributions. Additional estimations of the resultant lists of botnet addresses are performed by the botnet analyzer 130. These estimations reflect the degree of confidence associated with both the address list of a botnet as a whole and each individual IP address on the list.

The estimation of the whole botnet address list depends on the form of the distributions for the IP addresses of that list and ultimately determines the upper bound of the average number of false positives that the already identified botnets have. The probability for an individual address being on the list depends on how closely the distribution statistical data for this address matches other statistical distributions on the same list and how much statistical information is collected for that address.

Finally, the botnet addresses are organized into blacklists and the calculated probabilities are uploaded to the servers 120 that consult the blacklists every time a request from a client arrives. The period of time between each processing of statistics by the botnet analyzer 130 is determined by the amount of information that can be gathered by the servers 120. It is worth noting that if the resulting blacklists are used by the clients who do not contribute to the distribution statistics data, this can result in legitimate emails being blocked.

Thus, access to the blacklists should be restricted to the clients that contribute to the statistical data. Note that the email server might not blacklist a particular IP address even if there is a high probability of it being part of the botnet—for example, if it is a priori known that that particular computer belongs to someone who should not be blacklisted.

Spam-filtering technology of the exemplary embodiment pays particular attention to the problem of false positives. While it is always annoying when a legitimate message is blocked, blocking a legitimate IP address is much worse, since it can result in blocking hundreds or thousands of legitimate messages. A distribution function is a discrete function defined for a set of numbers: 0, 100, 200, 300 . . . and so on. Each number represents a message size in bytes, and a 100-byte (in this example) increment between the message sizes reflects the degree of accuracy of the statistical information used.

Figure 2:
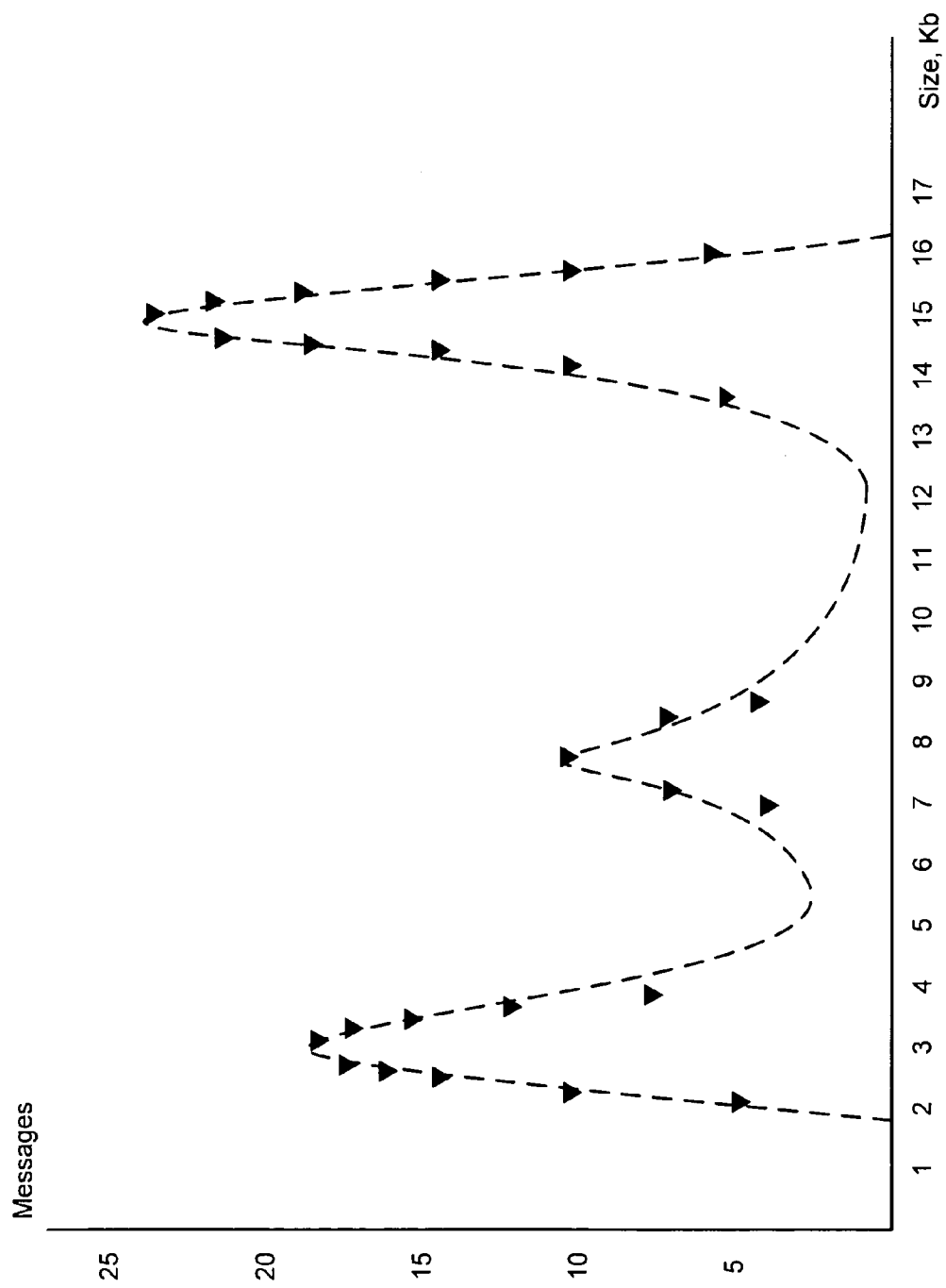
FIG. 2 illustrates a graph generated bases on the statistics collected for one source computer, in accordance with the exemplary embodiment.

FIG. 2 illustrates a graph generated bases on the distribution statistics collected for one source computer, in accordance with the exemplary embodiment. Each triangular dot on the graph represents a number of messages of a particular size. The size of each message is rounded up to 100 bytes. The dots can be connected into a graph in order to reflect a distribution function, which associates each message size with the number of messages of this sizes that fall into a 100 byte interval that starts at the given size. For example, if 3,300 bytes is associated with the number 9, then the originating host issued nine messages with sizes ranging from 3,300 bytes to 3,399 bytes.

Figure 3:
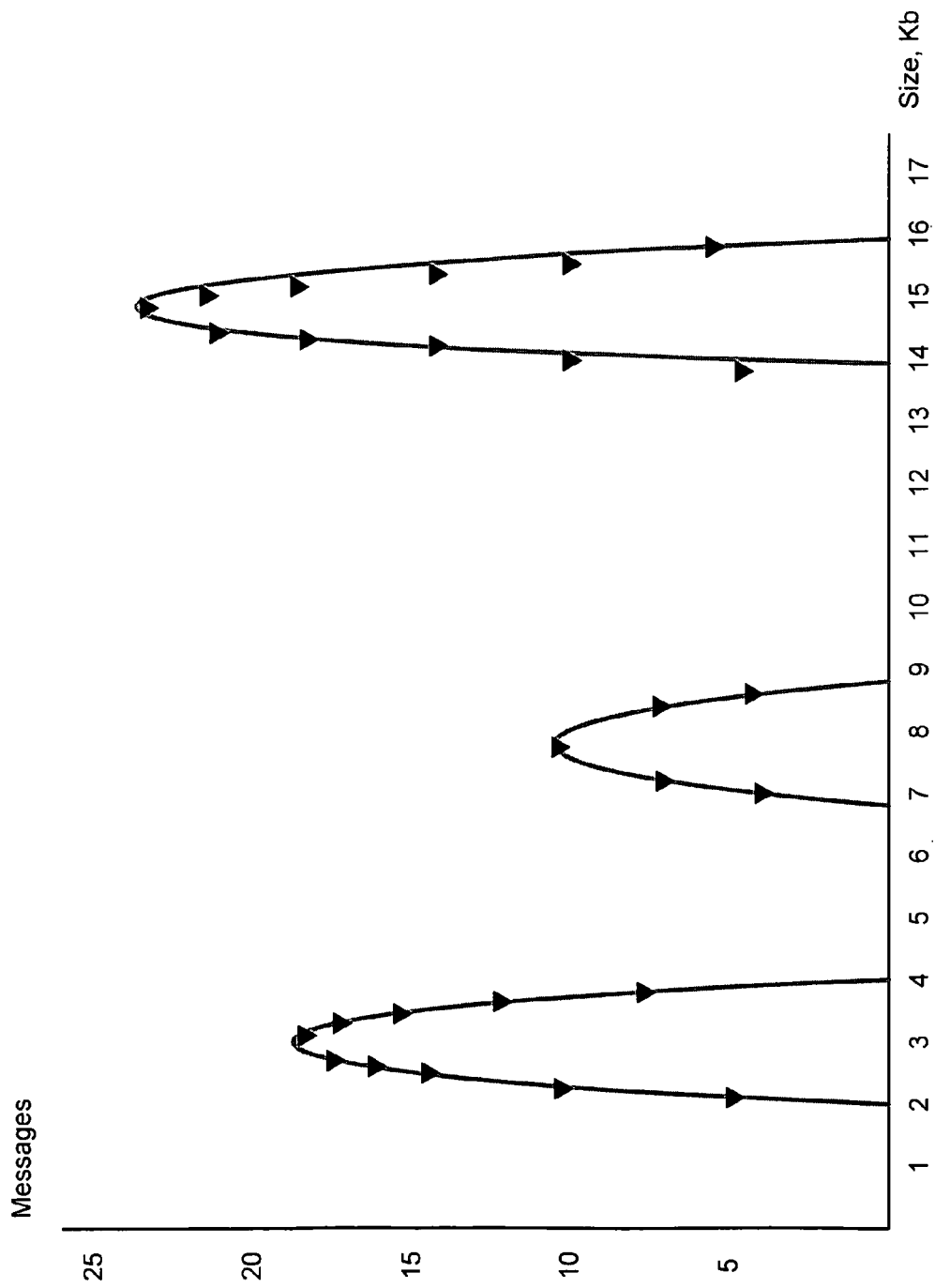
FIG. 3 illustrates a graph depicting some peaks based on a number of messages sent by one source computer, in accordance with the exemplary embodiment.

FIG. 3 illustrates a graph depicting some peaks based on a number of messages sent by one source computer, in accordance with the exemplary embodiment. In FIG. 3 an exemplary frequently occurring graphical form of distribution is depicted. This type of distribution represents a situation where the sizes of messages issued by a host are grouped around one or several centers. Such distributions look like a set of surges on the plot (i.e., a peak). As seen from FIG. 3, all message sizes are grouped near the sizes 3,000, 8,000 and 15,000 bytes. (It will, of course, be appreciated, that the graphs at issue are generated for human visualization purposes, and actual analysis needs only the distributions, not the visual graphs.)

The exemplary embodiment accomplishes two tasks: choosing some other distributions that match a given distribution depicted in FIG. 3 and estimating a number of false positives. Once the first task is accomplished, a list of botnet addresses can be generated based on matching distributions. However, it needs to be determined to what degree these results can be trusted or relied upon. This is accomplished by approximation of the distribution data depicted in FIG. 4.

Figure 4:
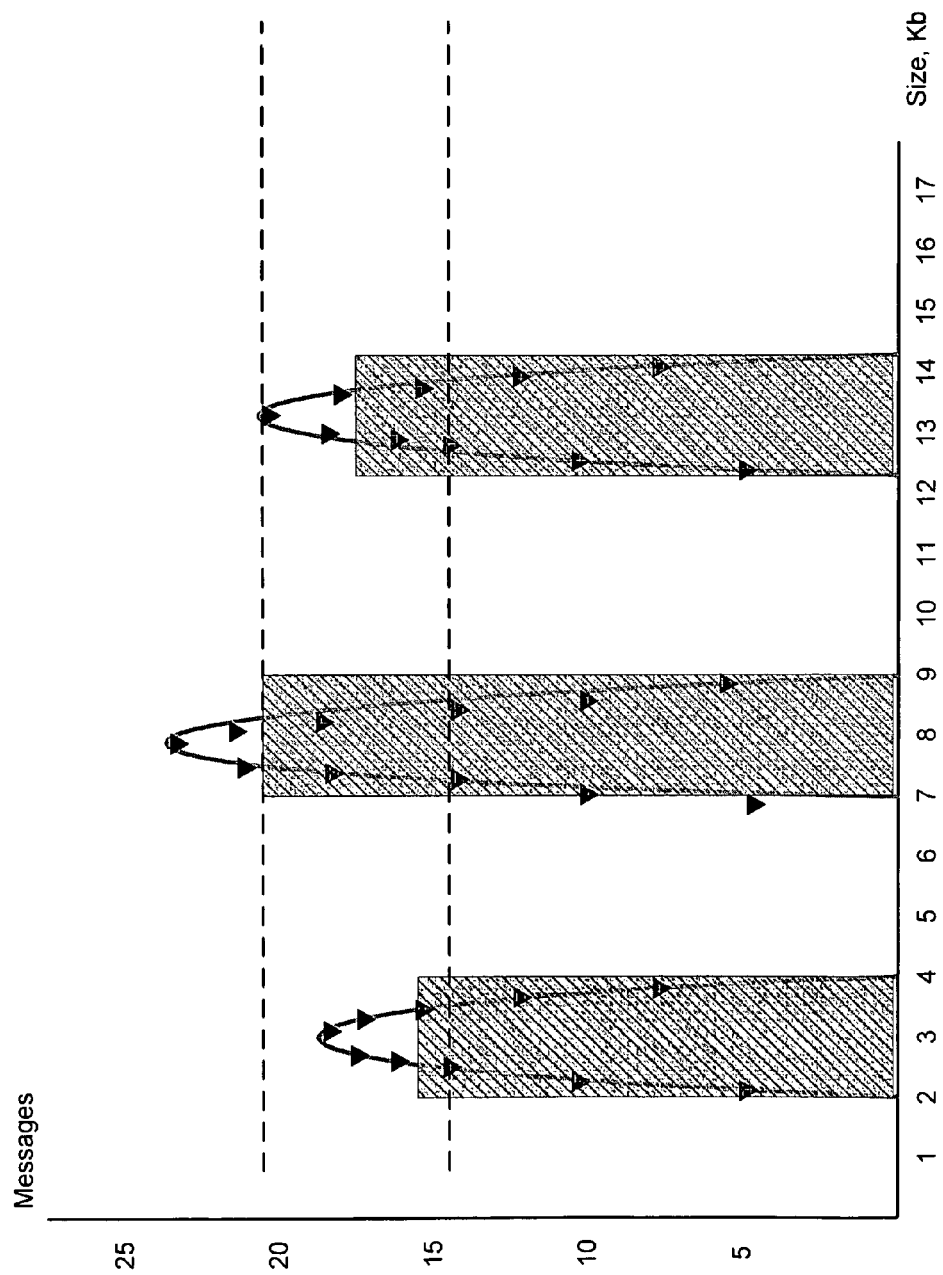
FIG. 4 illustrates a graph depicting approximation of the statistical data, in accordance with the exemplary embodiment.

Different source hosts issue a different number of messages over a certain period of time. Since the exemplary embodiment deals only with the forms of the distributions, a given distribution depicted in FIG. 3 can be approximated as shown in FIG. 4. A similarity transformation can be applied to the given distribution by multiplying it by a constant factor which is a ratio of the total number of messages issued by both hosts while comparing it with another one.

So, when comparing distributions and estimating probabilities, it is assumed the associated hosts issued an equal number of messages. Now, the size interval $\Delta=[0,10000]$ is divided into 10 equal subintervals $\Delta_1=[0,1000)$, $\Delta_2=[1000, 2000), \ldots, \Delta_{10}=[9000,10000]$ (the vertical dashed columns in FIG. 4) and approximate the original distribution function by a step function which is constant on each subinterval, namely, it equals the mean number of messages for the given subinterval:

$$x=1/10 \cdot \Sigma f((j-1) \cdot 1000+(i-1)-100),$$

where $j=1, \ldots, 10$ and f is the distribution function.

The values of the $\{x_j\}$ function are rational numbers 0, 0.1, 0.2, 0.3 ... and so on. One way to match two distributions is to test their approximating functions for coincidence, but imposing such a rigid condition leads to unsatisfactory results. Some variations in approximation functions need to be permitted. It is obvious that the wider the approximation variations are allowed, the larger the number of matching distributions will be determined and the larger the probability of false positives will be.

For exemplary purposes, it is assumed that variations as wide as 25% of the maximum value of $\{x_j\}$ are allowed. The two horizontal dashed lines in FIG. 4 define the upper and lower boundaries of all approximating step functions in order for them to match the given distribution (FIG. 3). Note that these functions must be non zero only on the $\Delta_2$, $\Delta_4$, and $\Delta_9$ intervals.

In one embodiment it is determined how many distributions would match the given distribution. For this, the probability of a randomly chosen host sending out email messages on the Internet having a distribution that matches the given distribution needs to be estimated. Let A denote the event that the distribution of a randomly chosen host matches the given distribution. Let $B_1$ be an event of all sizes in that distribution falling below the 10,000-byte boundary, and $B_2$ be an event of at least one size in that distribution being above that boundary. Then:

$$A=A \cdot B_1+A \cdot B_2$$

and since the events $A \cdot B_1$ and $A \cdot B_2$ are mutually exclusive, $$P(A)=P(A \cdot B_1)+P(A \cdot B_2)$$

By the equation of total probability:

$$P(A)=P(B_1) \cdot P(A/B_1)+P(B_2) \cdot P(A/B_2)$$

it is clear that the conditional probability $P(A/B_2)=0$, since taking a distribution that has at least one message above the 10,000-byte boundary (event $B_2$) results in non-matching distributions. Hence:

$$P(A)=P(B_1) \cdot P(A/B_1)$$

The probability that a randomly chosen distribution matches the given distribution equals the probability of choosing a distribution with all message sizes below the 10,000-byte boundary multiplied by the probability that the two distributions match, provided that all message sizes in the randomly chosen distribution are below the 10,000-byte boundary. From several experiments it was found that the probability of a randomly chosen host issuing messages that are below 10,000 bytes over the period of a day does not exceed 0.44. So, $P(B_1)<0.44$, as a working hypothesis.

The probability $P(A/B_1)$ depends on the number of messages issued by a host (assuming that all hosts issue an equal number of messages) and can be calculated as the number of favorable cases $N_f$ (i.e., a total number of possible distributions that match the given distribution) divided by the number of all possible cases $N_t$ (i.e. all possible distributions):

$$P(A/B_1)=N_f/N_t$$

Let $m=3 \cdot k$ be the number of messages issued by the source host and $k=4 \cdot r$ the number of messages grouped around each of the three 1,000-byte intervals (FIG. 3). The number of messages above the horizontal dashed line is $3 \cdot r$, and, in order to get a favorable case, these messages need to be rearranged between the three intervals so that each interval contains messages between $3 \cdot r$ and $5 \cdot r$. The number of these arrangements is:

$$N_f=C_{3 \cdot r+3-1}^{3-1}-C_3^1 \cdot C_{3 \cdot r+3-1-(2 \cdot r+1)}^{3-1}=C_{3 \cdot r+2}^2-3 \cdot C_{r+1}$$

where $$C_n^m=n!/m! \cdot (n-m)!$$

Note that at first glance it may seem that the total number of cases N can be calculated as the number of arrangements of $4 \cdot r \cdot 3$ messages on 10 intervals:

$$C_{4 \cdot r \cdot 3+10-1}^{10-1}$$

However, this is not the case, since not all distributions are equally likely.

From the analysis of statistical data it was found that the most frequently occurring distributions (with message sizes of up to 10,000 bytes) are those where the sizes lie in one, two or three different 1,000-byte intervals. Therefore, in the exemplary embodiment, the distributions where the message sizes occupy more than three intervals are left out and it is considered that the remaining distributions are equally possible. Leaving out distributions decreases the total number of distributions N, but this is acceptable, since an upper bound for the probability P(A) is being obtained.

The number of arrangements of 4·r·3 messages on three intervals is:

$$C_{4 \cdot r \cdot 3 + 3 - 1}^{3-1}$$

and these intervals can be taken in $C_{10}^3$ different ways. Therefore:

$$N = C_{10}^3 \cdot C_{12r+2}^2$$

and the probability is:

$$P(A) < 0.44 \cdot \frac{C_{3 \cdot r+2}^2 - 3 \cdot C_{r+1}^2}{C_{10}^3 \cdot C_{12 \cdot r+2}^2},$$

where r is the number of messages issued by a source host divided by

Note that similar formulas can be derived for the allowed variations in the approximating function of 0% and 50% and also for distributions that have four and more surges. The exemplary results are represented in Table 1:

fact, the formula above determines a metric in a finite dimensional space of all step functions defined on some large interval. Alternatively, other approaches to botnet infiltration analysis can be performed in terms of choice of spaces and metrics in them.

Figure 5:
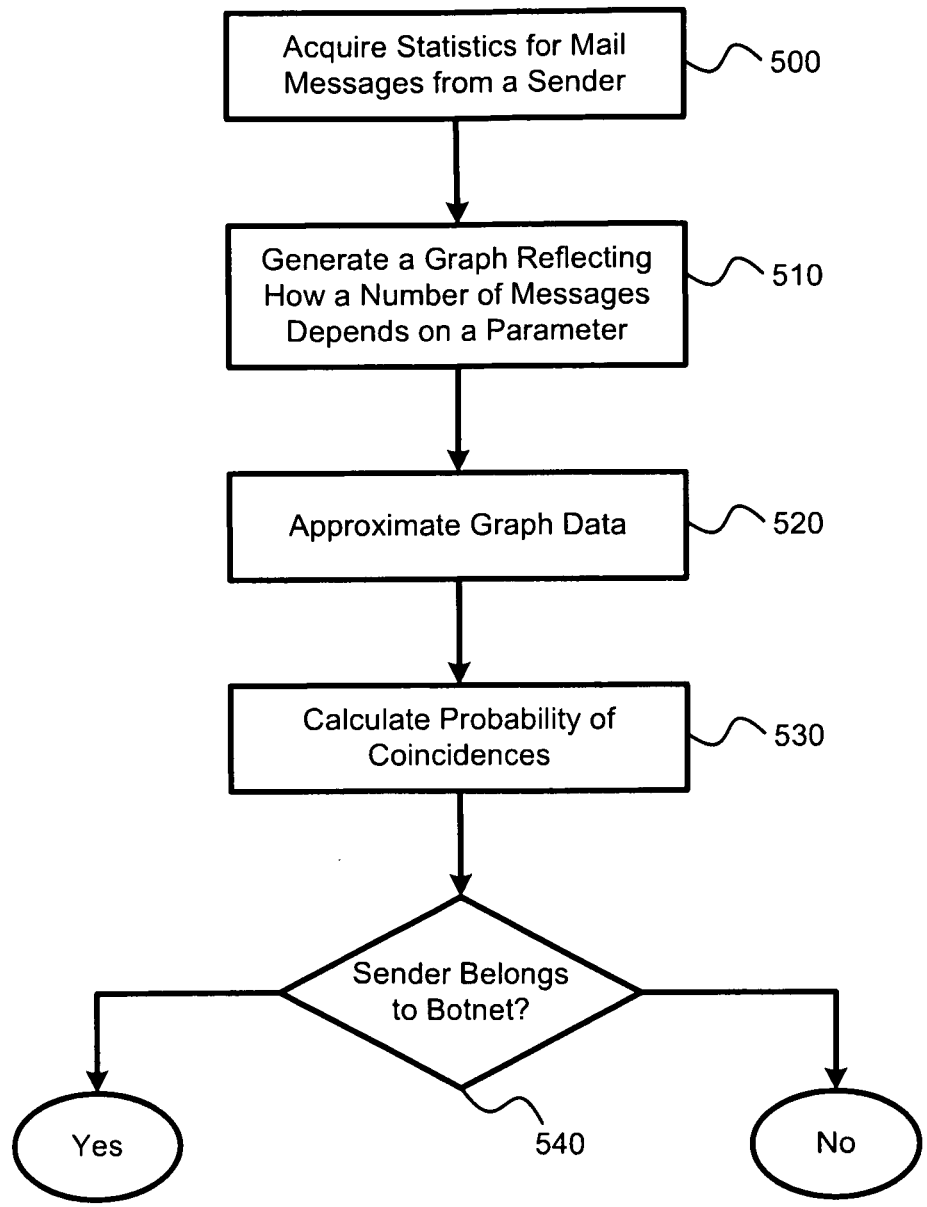
FIG. 5 illustrates a flowchart of a method for tracking botnets, in accordance with the exemplary embodiment.

FIG. 5 illustrates a flowchart of a method for tracking botnets, in accordance with the exemplary embodiment. First, statistical data for mail messages received from a particular sender is collected at step 500. A graph reflecting a distribution of messages based on a parameter is generated at step 510. Then, the graph data is approximated at step 520 and the probability (i.e., degree) of coincidence of two distributions is calculated at step 530.

Based on the degree of coincidence calculated at step 530, it is determined, at step 540, whether a sender belongs to a botnet. Note that the botnet analyzer 130 (FIG. 1) approximates and compares the distribution data in a digital form. The graphical representations of distributions are generated only for network administrators to be able to have a visual estimation of the statistical distributions of various senders.

| Surges | Variation | Number of messages | | | | | |
|---|---|---|---|---|---|---|---|
| | | 48 | 96 | 192 | 384 | 768 | 1536 |
| 3 | 0 | 0.000002993 | 0.000000771 | 0.000000196 | 0.000000049 | 0.000000012 | 0.000000003 |
| 3 | 25 | 0.000182585 | 0.000167403 | 0.000160016 | 0.000156378 | 0.000154573 | 0.000153674 |
| 3 | 50 | 0.000649524 | 0.000630269 | 0.000620676 | 0.000615889 | 0.000613499 | 0.000612305 |
| 4 | 0 | 0.000000101 | 0.000000013 | 0.000000002 | 0.000000000 | 0.000000000 | 0.000000000 |
| 4 | 25 | 0.000023241 | 0.000019623 | 0.000017950 | 0.000017148 | 0.000016756 | 0.000016562 |
| 4 | 50 | 0.000147799 | 0.000139260 | 0.000135076 | 0.000133006 | 0.000131977 | 0.000131464 |

Table 1 illustrates that the probability of two exemplary distributions matching each other depends on both the form of the distribution (surges) and approximation restriction (i.e., variation). As seen from the Table 1, the best results are obtained for the exact-match comparison method (i.e., variation=0). More complex distributions (surges=4) reduce the probability by an order of magnitude. The probability also decreases slightly as the number of messages sent by a source host increases.

At first glance, the probabilities seem rather small but, in fact, some values might not be sufficient for practical use. For example, the probability value of 0.000017950 for a four-surge distribution means that, on average, one false positive occurs per 55,710 hosts; the probability value 0.000160016 for a three-surge distribution means that one false positive occurs per 6,249 hosts. The exemplary embodiment uses more complex algorithms when comparing distributions, which, advantageously, results in much smaller values for false positive probabilities.

The exemplary probabilities provided in Table 1 above are used to describe the list of botnet addresses as a whole. However, in order to describe how closely the distributions of the botnet match each other, the concept of a distance between two distributions is used. Since the exemplary embodiment uses approximating step functions instead of real distributions, the distance between the two approximating step functions $\{\chi_i\}$ and $\{\delta_i\}$ can be defined as:

$$d(\chi, \delta) = \max_{1 \leq i \leq n} |\delta_i - \chi_i|$$

Assuming there is one fixed distribution in a botnet, this formula can be used to evaluate a host inside the botnet list. In In another exemplary embodiment, a method for updating botnets is provided. A statistical method for analyzing the hosts that send out SPAM and updating botnets is implemented based on distribution statistics collected from different botnets and from numerous single hosts.

The proposed method uses the fact that a computer in a botnet has to distribute content using the activity (i.e., distribution) patterns closely resembling the distribution patterns of other computers in the same botnet over the same period of time. Based on comparison of the distributions statistics (such as, for example, peaks, patterns, time characteristics, etc.) it is determined whether the computer belongs to a botnet. If the computer belongs to the botnet, the botnet is updated accordingly. Thus, the botnet can be dealt with in a more efficient way.

Figure 6A:
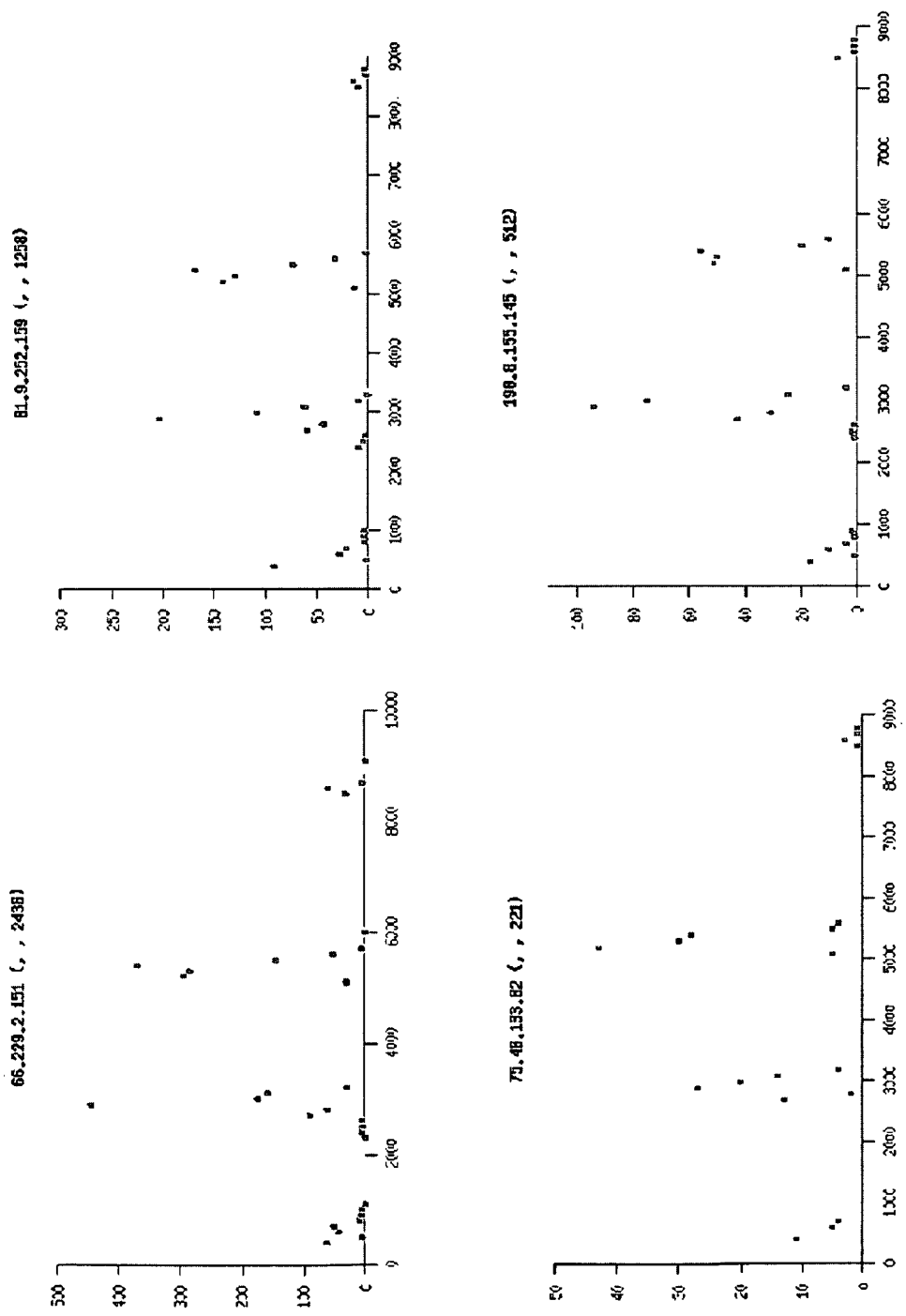
FIG. 6A illustrates an exemplary distribution for different botnet hosts sending out multiple SPAM messages.

FIG. 6A illustrates exemplary distribution for different botnet hosts sending out multiple SPAM messages. A distribution for each of the host is shown in a graphical form depicting a number of messages sent over a period of time based on a size of each message. As seen from FIG. 6A, a host with the IP address 66.229.2.151 had sent a total of 2436 messages. A host with the IP address 75.40.133.82 had sent a total of 221 messages. Over the same period of time, a host with the IP address 81.9.252.159 had sent 1258 messages, while a host with the IP address 190.8.155.145 had sent 512 messages.

It can also be seen from the graphs that, while a total number of messages sent by each host is different (even in an order of up to 10 times), their statistical distributions are similar and have distinguishable peaks representing the messages within a particular size range. These distribution peaks suggest that these hosts are sending out the same or very similar SPAM messages.

Figure 6B:
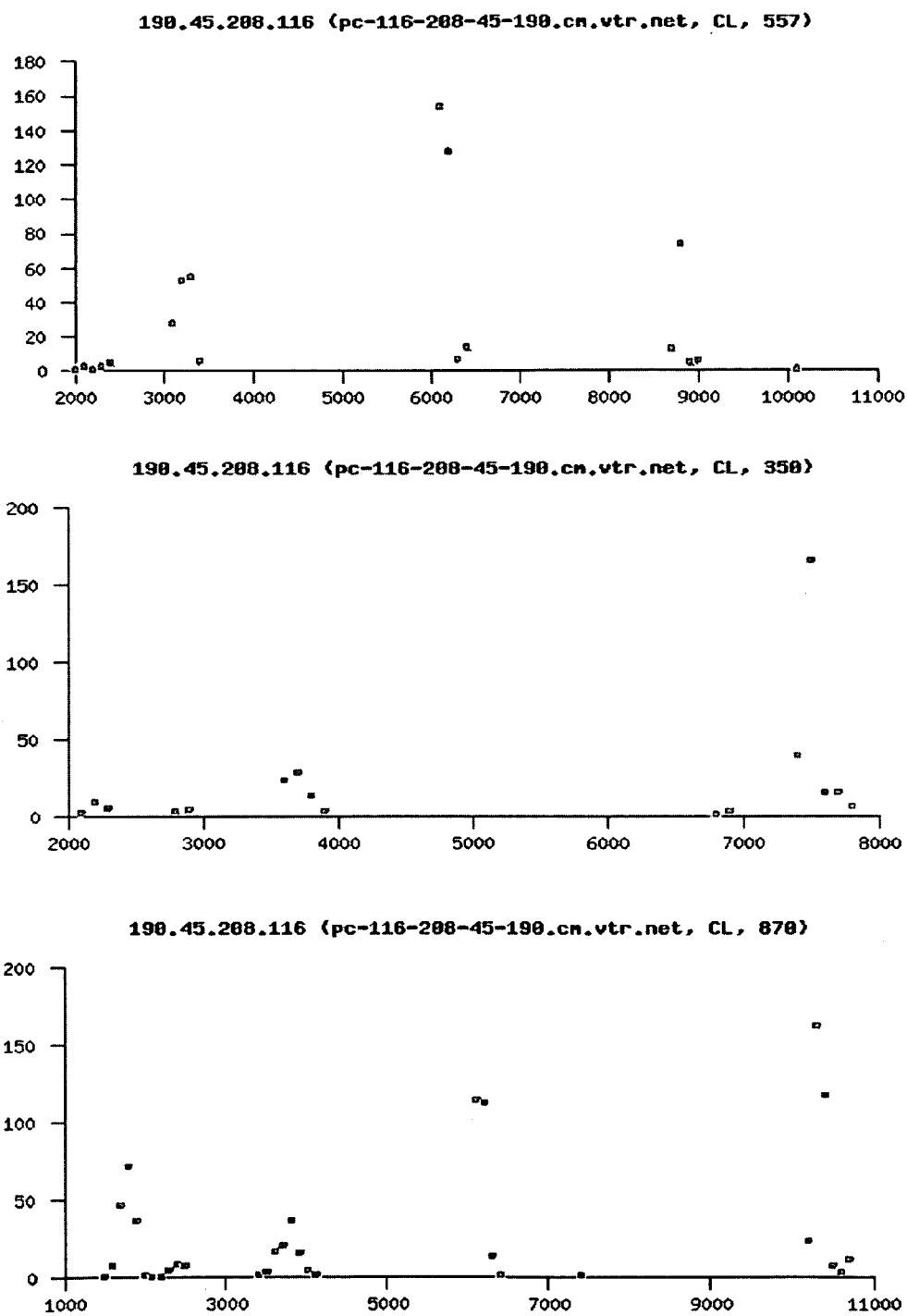
FIG. 6B illustrates a statistical distribution for one of the botnet hosts over a longer period of time.

FIG. 6B illustrates a statistical distribution for one of the botnet hosts (IP address 190.45.208.116) over a longer period of time (3 days in the given example). Well defined peaks can be seen during each day for messages of the following sizes: ~2 Kb, ~3 Kb, ~6-7 Kb. It also shows a peak for messages of ~9 Kb in size on one of the days. These distributions suggest that the particular host is programmed to send out different SPAM messages on different days.

Figure 7:
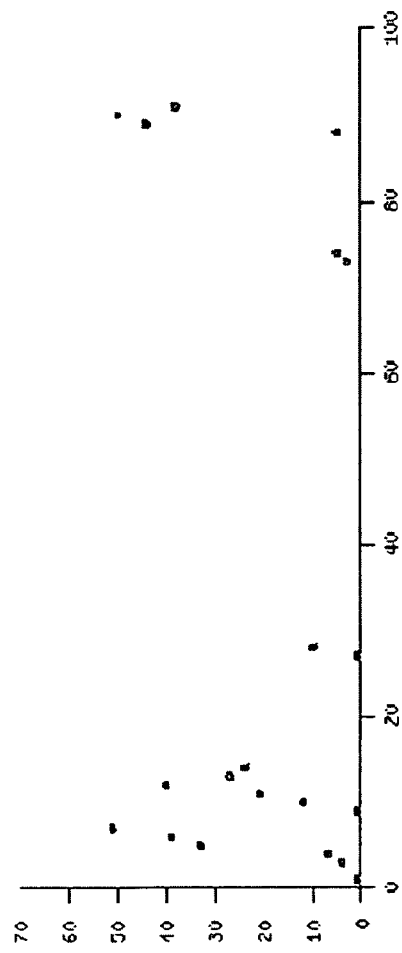
FIG. 7 illustrates an exemplary statistical distribution for two of the exemplary hosts based on the time of the day.
Figure 7:
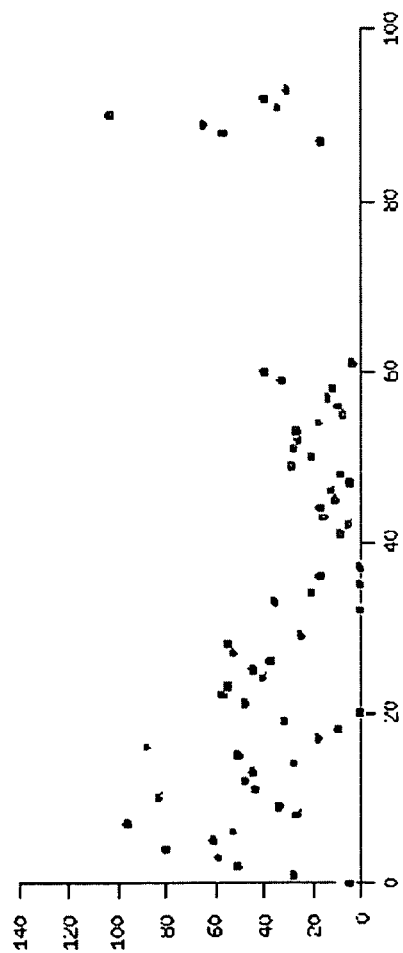

FIG. 7 illustrates an exemplary statistical distribution for two of the exemplary hosts (IP addresses 190.8.155.145 and 66.229.2.151) based on the time of the day. The dots on the graph represent a number of messages sent within 15 minute intervals. Thus, for example, a number 20 on a horizontal line of the graph represents a time of 5 a.m. The exemplary dot with coordinates (20, 3) represents 3 messages sent between 5 a.m. and 5:15 a.m. It can be clearly seen from the graphs depicted in FIG. 7 that the host 190.8.155.145 was active only at night and late in the evening, while the host 66.229.2.151 was sending messages during the day.

Analysis of the statistical distributions from different botnet hosts show that a given botnet is programmed to work differently on different days and during different times of the day. Different botnets also operate differently on different days and during different hours.

Figure 8:
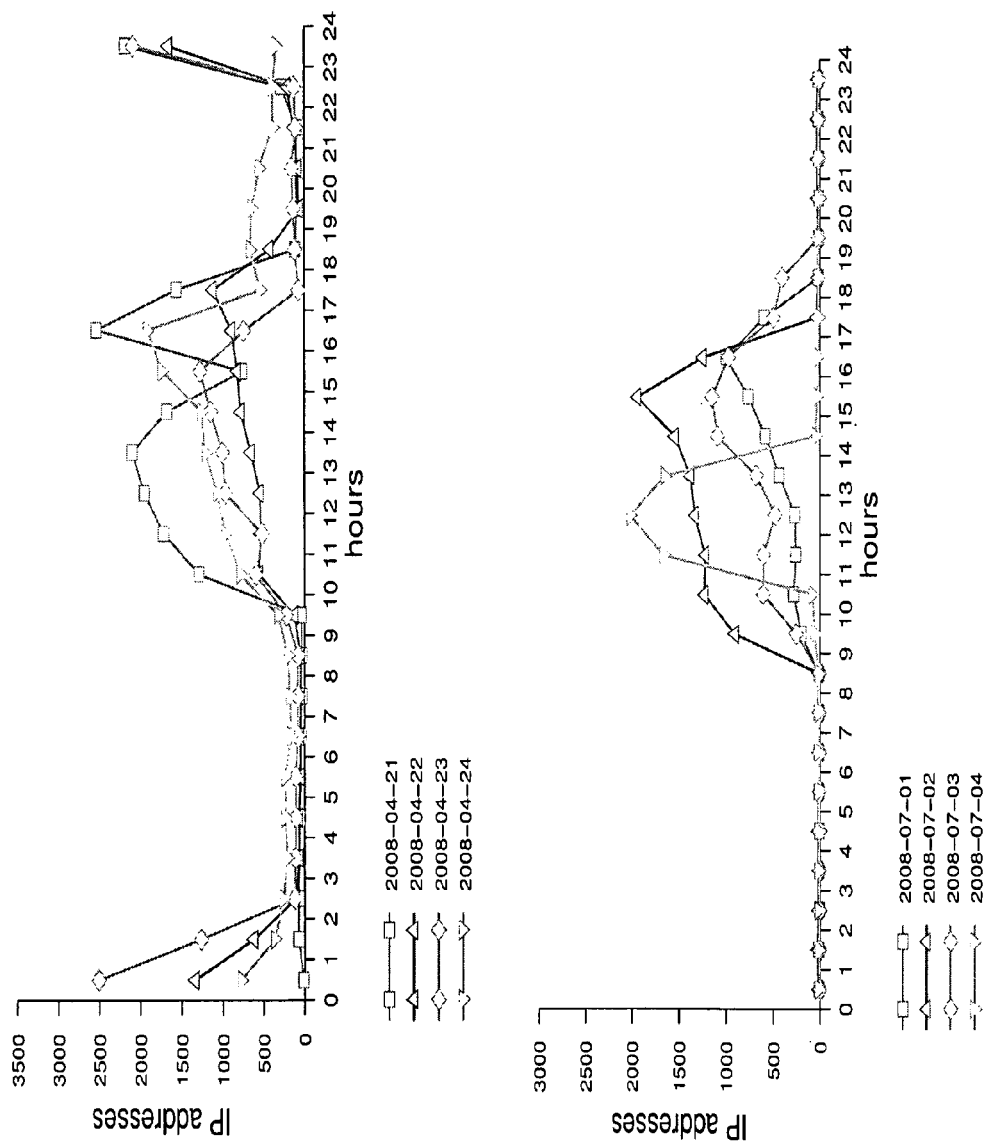
FIG. 8 illustrates activity of botnets based on a number of hosts that send out messages at different times of the day.

This tendency can be clearly seen from FIG. 8 illustrating activity of botnets based on a number of hosts that send out messages at different times of the day. The upper graph illustrates exemplary statistical distribution for a number of botnets collected from Mar. 21 through Mar. 24 (of 2008). The lower graph shows statistical distribution for a period from Jul. 1 through 4 (of 2007). While these statistics are taken a long time apart, they show the same tendency—the most messages are sent from 10 a.m. to 6 p.m. (e.g., during the business hours).

Figure 9:
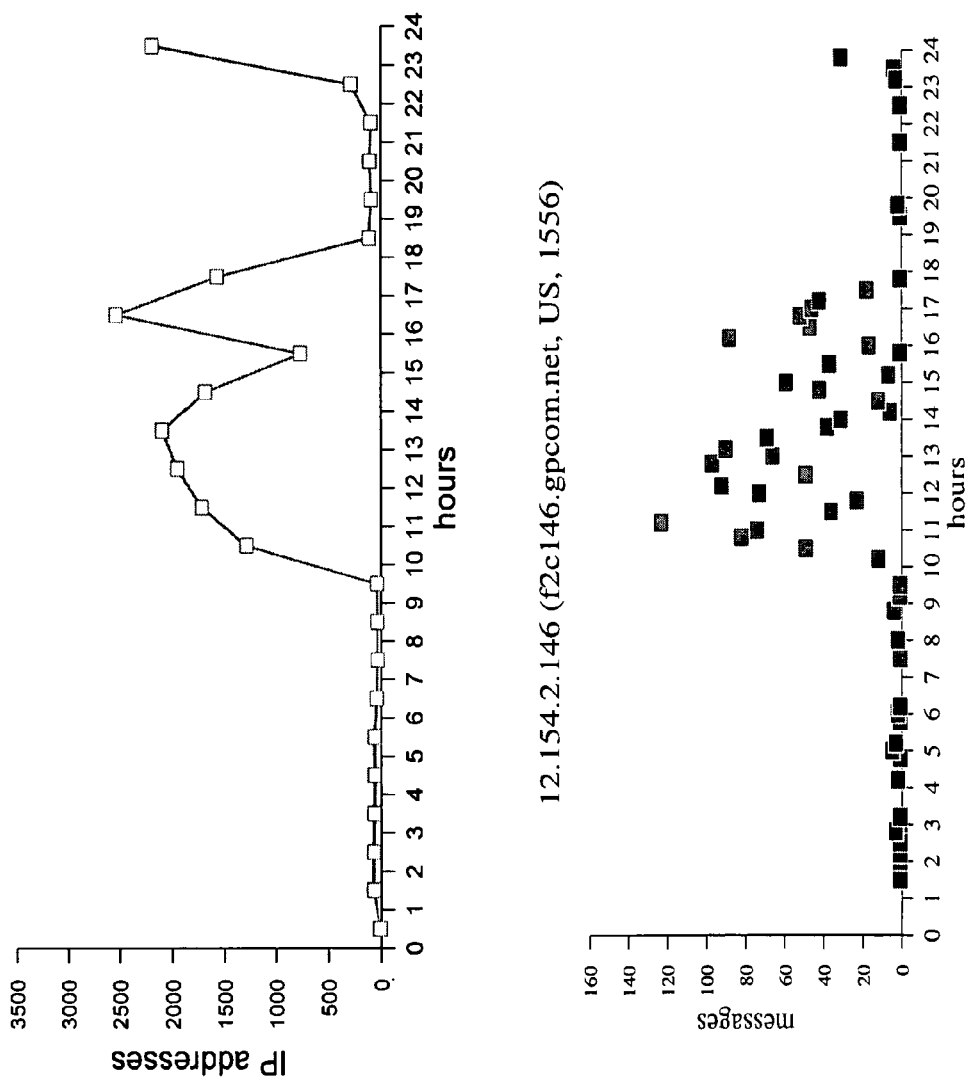

FIG. 9 illustrates exemplary statistical analysis of an activity of a single host as it compares to the activity of the botnet the host belongs to. The lower graph illustrates the statistical distribution collected for the exemplary single host (IP address 12.154.2.146) over a period of time. The upper graph represents the statistical distribution collected for the entire botnet over the same period of time. It can be clearly seen that this host belongs to the botnet since its activity closely minors the activity of the botnet. Both the host and the botnet show the same peaks of activity during the business hours.

Therefore, using the statistical analysis described above, it can be accurately determined if a given host that sends out SPAM belongs to a particular botnet. This host can be included into the botnet for SPAM filtering purposes. Thus, by constantly analyzing single hosts and the existing botnets, the botnets can be updated and dealt with more efficiently. Also, if a particular host stops showing behavior that matches behavior of the botnet, then that host can be deleted from the list of hosts that make up the botnet. It should also be noted that the botnet is essentially a dynamic concept—the list of hosts that make up the botnet is updated continuously, with some hosts being added, and some removed from the botnet. Empirically, a period of analysis corresponding to a few hours has been determined to be the most efficient time period over which to determine a pattern of behavior of the botnet. However, depending on particular botnet, the time period may be shorter (e.g., a few minutes, particularly if the number of hosts and the number of emails being covered by the analysis is relatively large), or longer, such as a few days.

Those skilled in the art will appreciate that the preferred embodiment provides for an effective botnet updating method that is easily implemented on a client side. The proposed method does not require any significant amounts of data to be transferred to a server by the clients.

Figure 10:
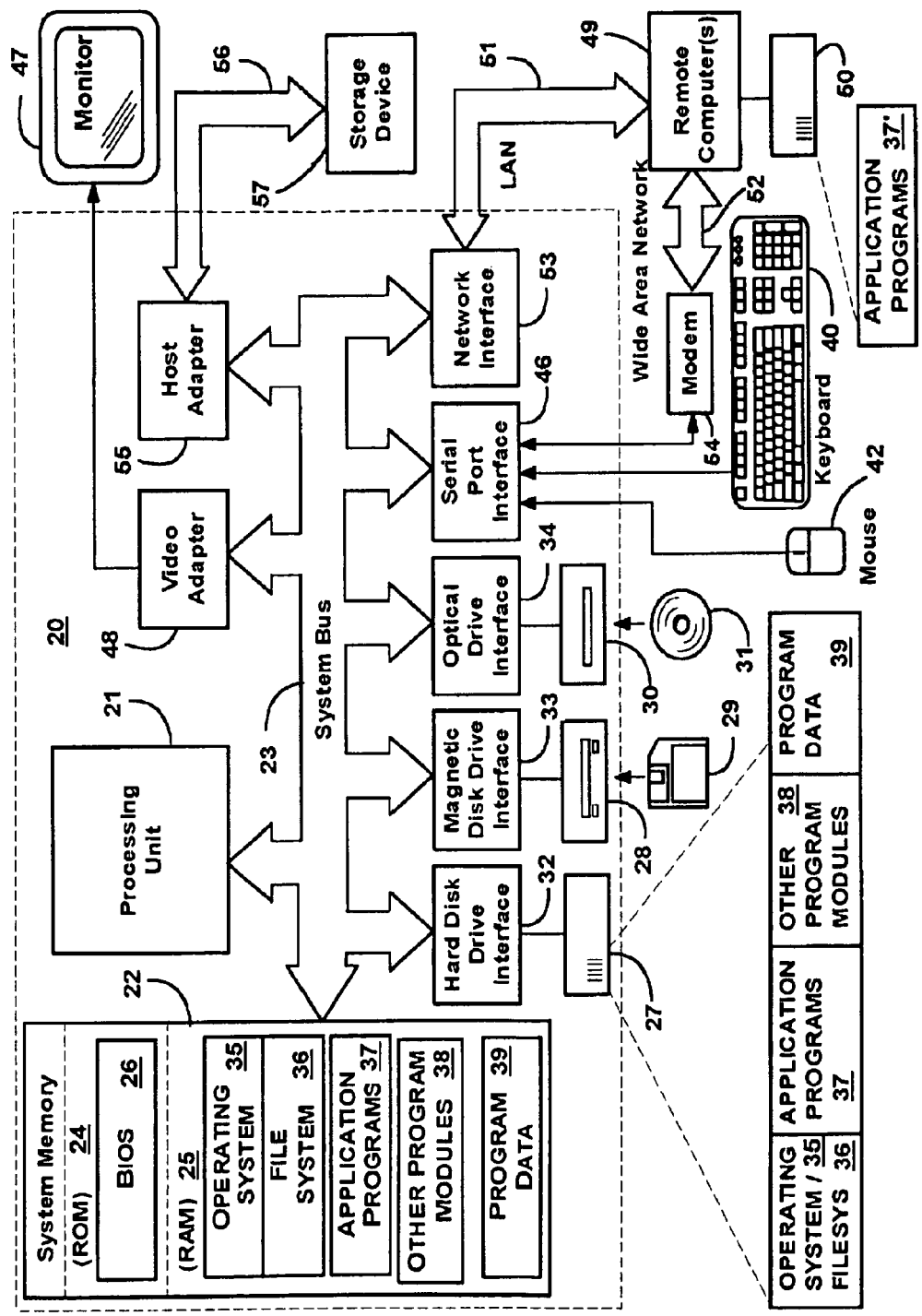
FIG. 10 illustrates a schematic of an exemplary computer system on which the exemplary embodiment can be implemented.

With reference to FIG. 10, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the personal computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for effective updating and protecting against the botnets that send out SPAM.

It should also be appreciated that various modifications, adaptations and alternative embodiments thereof may be made within the scope and spirit of the present invention. The invention is further defined by the following claims.

What is claimed is:

1. A method for updating a botnet based on statistical data, the method comprising:
   (a) acquiring, by a computer, botnet distribution of message size-based and timestamp-based statistics for all messages, including any non-spare messages, received from a known botnet over a time period, without acquiring contents of the messages from a remote server;
   (b) analyzing the botnet distribution statistics based on messages and determining an activity pattern of the botnet based on the botnet distribution statistics of a number of messages, with timestamps of the messages from the botnet distributed into a set of time intervals;
   (c) acquiring a continuous host distribution of message size-based statistics or timestamp-based statistics for all messages received from a single host over the time period, without acquiring contents of the messages from the remote server;
   (d) analyzing the host distribution statistics and determining a distribution pattern of the single host, with timestamps of the messages from the single host distributed into a set of time intervals, based on the host distribution statistics;
   (e) comparing the distribution statistics of the botnet with the distribution statistics of the single host; and
   (f) determining if the single host belongs to the botnet based on a degree of similarity of the distribution statistics and a similarity of their approximating functions.

2. The method of claim 1, further comprising generating a graph representing each distribution statistics.

3. The method of claim 1, wherein the determining of the distribution pattern is also based on any of:
   a distribution of messages by time of a day;
   a distribution of messages by word count; and
   a distribution of specific word occurrences.

4. The method of claim 1, further comprising adding an IP address of the single host to a list of known botnet IP addresses, if it is determined in step (f) that the single host belongs to the botnet.

5. The method of claim 1, further comprising determining peaks in the distribution patterns of the botnet and of the single host.

6. The method of claim 1, further comprising deleting a particular host from the botnet if its distribution pattern over the time period does not match the distribution pattern of the botnet.

7. The method of claim 5, wherein the comparing comprises comparing the peaks in the distribution patterns.

8. A system for updating a botnet based on statistical data, the system comprising:
   a processor;
   a memory coupled to the processor; computer code loaded into the memory for implementing the following functionality:
   (a) acquiring botnet distribution of messages size-based and timestamp-based statistics for all messages, including any non-spam messages, received from a known botnet over a time period, without acquiring contents of the messages from a remote server;
   (b) analyzing the botnet distribution statistics and determining a distribution pattern of the botnet, with timestamps of the messages from the botnet distributed into a set of time intervals, based on the botnet distribution statistics;
   (c) acquiring a continuous host distribution of messages size-based statistics or timestamp-based statistics for all messages received from a single host over the time period, without acquiring contents of the messages from the remote server, with timestamps of the messages from the single host distributed into the set of time intervals;
   (d) analyzing the host distribution statistics and determining a distribution pattern of the single host based on the host distribution statistics;
   (e) comparing the distribution statistics of the botnet with the distribution statistics of the single host; and
   (f) determining if the single host belongs to the botnet based on a degree of similarity of the distribution statistics and a similarity of their approximating functions.

9. The system of claim 8, wherein the system generates a graph representing each distribution statistics.

10. The system of claim 8, wherein the determining of the distribution pattern is also based on any of:
    a distribution of messages by time of a day;
    a distribution of messages by word count; and
    a distribution of specific word occurrences.

11. The system of claim 8, wherein the system adds an IP address of the single host to a list of known botnet IP addresses, the system determines that the single host belongs to the botnet.

12. The system of claim 8, wherein the system determines peaks in the distribution patterns of the botnet and of the single host.

13. The system of claim 8, wherein the system deletes a particular host from the botnet if its distribution pattern over the time period does not match the distribution pattern of the botnet.

14. The system of claim 13, wherein the system compares the peaks in the distribution patterns.

15. The method of claim 1, wherein the distributions statistics are based on a message time stamp.

16. The method of claim 1, wherein the distribution statistics are based on a message size and message time stamp pair.

* * * * *